United States Patent [19]

Cotillier

[11] Patent Number: 4,596,085
[45] Date of Patent: Jun. 24, 1986

[54] FISH FINDING PROBE

[76] Inventor: James C. Cotillier, 334 W. Woodbury Rd., Altadena, Calif. 91001

[21] Appl. No.: 627,568

[22] Filed: Jul. 3, 1984

[51] Int. Cl.⁴ ............................................. A01K 79/00
[52] U.S. Cl. ........................................... 43/4.5; 43/17
[58] Field of Search .............. 43/4, 4.5, 16, 17, 43.12, 43/43.14, 44.81, 42.06, 43.1, 1, 58; 116/211; 73/305, 307, 309, 427

[56] References Cited

U.S. PATENT DOCUMENTS

| | | | |
|---|---|---|---|
| 1,917,967 | 7/1933 | Green | 43/43.12 |
| 2,675,776 | 4/1954 | Tuve | 116/211 |
| 2,810,229 | 10/1957 | Allyn | 43/4.5 |
| 2,869,279 | 1/1959 | Pretorius | 43/42.06 |
| 2,928,202 | 3/1960 | Smerke | 43/43.12 |
| 2,968,053 | 1/1961 | Gogolick et al. . | |
| 3,047,975 | 8/1962 | Pretorius | 43/42.06 |
| 3,052,205 | 9/1962 | Taslitt et al. . | |
| 3,093,107 | 6/1983 | Grand et al. . | |
| 3,170,438 | 2/1965 | Nadler et al. | 116/211 |
| 3,280,549 | 10/1966 | Hsu | 116/211 |
| 3,496,906 | 2/1970 | Gerke | 116/211 |
| 4,077,151 | 3/1978 | Johnson | 43/43.12 |
| 4,307,605 | 12/1981 | Niskin . | |

Primary Examiner—Nicholas P. Godici
Assistant Examiner—M. Jordan
Attorney, Agent, or Firm—Cushman, Darby & Cushman

[57] ABSTRACT

An elongated resilient cylindrical tube capable of returning to its original shape after being forceably deformed has a closed end and an open end. A sleeve is fixed to the open end of the tube. The tube is filled with buoyancy material and a plurality of different colored dyes, and the sleeve is sealed with a weighted plug coupled to a fish hook. The probe is submerged in the water, and descends due to the weight of the plug. The plug unseals the sleeve when the force of a hooked fish is exerted upon it, causing the probe to ascend toward the surface. As the probe ascends, the different colors of dyes are successively expelled from the probe. The color of the dye which is first expelled by the probe when the probe reaches the surface is indicative of the depth at which the plug was removed from the body.

30 Claims, 5 Drawing Figures

FISH FINDING PROBE

FIELD OF THE INVENTION

The present invention relates to the detection and depth sounding of schools of fish.

BACKGROUND OF THE INVENTION

There has long existed a need for a low-cost, dependable way to ascertain the presence and depth of fish or other bait-taking aquatic creatures. A major problem which commercial fishing fleets constantly confront is the inability to locate schools of fish. Water temperature and currents may be measured and analyzed in order to provide possible indications of areas of the sea in which a school of fish might be found, but the process of locating migratory schools of fish has always involved a great deal of quess-work and intuition. Since little is known about the migration patterns of schools of fish, a fishing captain's "Sixth Sense" as to where fish can be found is often far more reliable than presently-existing scientific analysis.

An alternate and more reliable way to locate schools of fish is to actually sense their presence. Sonar or radar is often used to detect the presence of a large school of fish. It is typically impractical to deploy large numbers of such detecting devices because of the large expense involved and the short life span of the devices due to the harshness of the sea environment. Sensing systems are sometimes placed aboard helicopters or other aircraft which fly over the surface of the sea in search of schools of fish. However, sonar or radar systems are relatively expensive to obtain and operate and often require a skilled individual to operate the controls and analyze the data provided.

SUMMARY OF THE INVENTION

The present invention provides a low-cost dependable way to ascertain the presence of underwater fish or other bait-taking aquatic creatures from the surface of the water on a one-time expendable basis. A body sinks below the surface of the water. The body is provided with a sensing device which senses the presence of fish in the water. If the presence of fish is sensed, the sensing device colors the water in the vicinity of the body to provide a visual indication that fish are present in the water.

The sensing device preferably includes a hook for hooking the fish and may further include bait for attracting fish to the hook. The sensing device causes the body to ascend to the surface of the water in response to the presence of fish in the water. The body may sequentially release a plurality of different materials into the water as the body ascends to the surface of the water, each of the different materials coloring the water a different color. The depth at which the fish are sensed may be ascertained by the observing the first color to appear on the surface of the water.

The body preferably defines a plurality of interconnected chambers, one of the plurality of different coloring materials disposed in each of the plurality of chambers. The sensing device preferably communicates one of the plurality of interconnected chambers with the water when fish are sensed. The body preferably defines an aperture communicating with one of the plurality of interconnected chambers, and the sensing device includes a plug removably disposed in the aperture for plugging the aperture and for increasing the density of the probe to greater than the density of water. The hook may be coupled to the plug, and may couple the force exerted by a hooked fish to the plug to remove the plug from the aperture. The body preferably includes a flotation device which raises the density of the body to less than the density of water when the plug is not disposed in the aperture.

The body may comprise a tube open at one end and closed at the other and having walls of resilient material. The plurality of interconnected chambers may be separated from one another by restrictions in the walls of the tube. The open end of the tube may define the aperture. The tube preferably comprises a balloon having a large longitudinal dimension. A means may be provided to retain the body in a folded-up configuration until the body sinks below the surface of the water. The body may be folded at the restrictions in the walls of the tube.

The present invention provides a simple, portable, expendable and inexpensive device which detects the presence of fish and provides a wide variety of other useful data. Not only the presence of fish, but the depth at which the fish are swimming in the water and the rate and attraction of movement of the fish can be detected. The present invention provides a simple visible indication of fish presence and activity which can be readily be seen from the surface of the water. The present invention is simple and extremely inexpensive to manufacture, and does not pollute the environment.

BRIEF DESCRIPTION OF THE DRAWINGS

These and other objects and advantages of the present invention will be better and more completely understood by reading the following detailed description of an exemplary embodiment in conjunction with the accompanying drawings of which.

DETAILED DESCRIPTION OF THE PREFERRED EMBODIMENT

Figure 1:
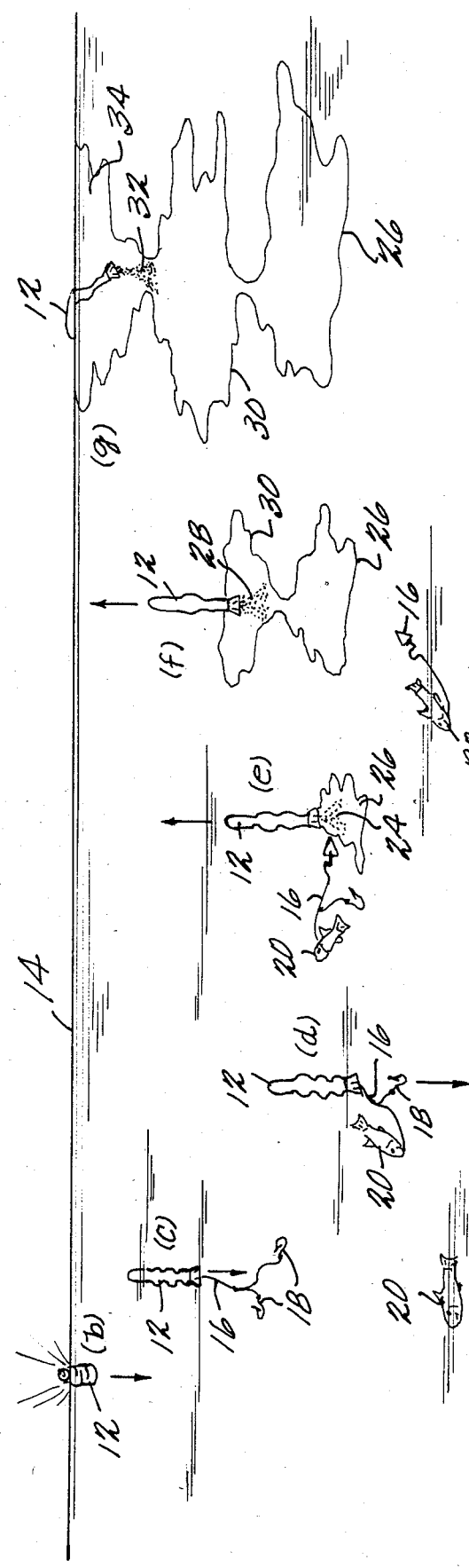
FIGS. 1(A)-1(G) are graphical illustration of a together method of detecting the presence and depth of fish in accordance with the present invention.

A method of detecting the presence of fish in accordance with the present invention is graphically illustrated in FIGS. 1(A)-1(G). An aircraft 10 drops a probe 12 in accordance with the present invention into the water 14. Probe 12 descends through the air (position a) and strikes the surface of water 14 (position b). The density of probe 12 when it is deployed is greater than the density of water 14, causing the probe to descend below the surface of the water. Probe 12 comprises a body having a relatively large longitudinal dimension, but is deployed in a more compact (folded) configuration (as will be discussed shortly) to reduce air resistance and storage dimensions. Once probe 12 descends below the surface of water 14, however, it unfolds into its natural elongated shape (shown in position c).

One end of a leader line 16 is attached to probe 12, while the other end of the leader line is attached to at least one hook 18. Hook 18 may comprise a conventional fishing hook, and may be baited with any suitable bait (as is well known in the art). Baited hook 18 will attract fish which are swimming in the water 14 in the vicinity of probe 12.

If there are any fish 20 in the vicinity of descending probe 12, the fish will go after baited hook 18 and will hook themselves on the hook (as shown in position d). The hooked fish 20 swim away from probe 12 until the leader line 16 becomes taut. Once hooked fish 20 realizes that it is hooked, it begins to swim more energetically. When the force exerted by hooked fish 20 on leader line 16 exceeds a predetermined threshold, a plug 22 to which leader line 16 is attached is pulled out of probe 12. An aperture formerly sealed by plug 22 communicates with the water 14, permitting a quantity of a first dye 24 to escape from probe 12 through the open aperture and into the water. Escaping dye 24 colors a region 26 of water 14 a first color (as is shown in position e).

The removal of plug 22 from probe 12 (and the escaping of dye 24 from the probe) decreases the density of the probe to less than that of water 14. Accordingly, probe 12 begins to ascend toward the surface of water 14, leaving a trail of dye 24 as it ascends. The volume of color region 26 caused by the dissolving of dye 24 into water 14 expands as the dye further diffuses into the water. When the quantity of first dye 24 contained by probe 12 is exhausted, a quantity of a second dye 28 having a different color from that of the dye 24 begins to discharge from probe 12 thereby forming a second colored region 30 of a different color than first colored region 26. Probe 12 all the while continues to ascend toward the surface of water 14 (as shown in position f).

Probe 12 will finally reach the surface of water 14 (shown in position g). Upon reaching the surface of water 14, probe 12 continues to discharge dye. If the quantity of second dye 28 is exhausted before probe 12 reaches the surface of water 14, a quantity of a third dye 32 (of a different color than the color of dyes 24 or 28) begins to be expelled from the probe. A third color region 34 is formed as dye 32 dissolves into the water 14 which is yet a different color than the color of regions 26 and 36. Because dye 32 is released into the water 14 when probe 12 is nearest to (and in this case at) the surface of the water, third color region 34 is formed closest to (at) the surface of the water and will be the first color visible from aircraft 10.

A lookout in aircraft 10 can observe the surface of water 14 to determine if any colored regions are formed in the water. If the water is colored, the lookout knows that probe 12 has detected fish 20 below the surface of the water. The lookout can also roughly determine the depth at which fish 20 removed plug 22 from probe 12 by noting the *first* color to appear at the surface of water 14. For instance, if the third colored region 34 is formed at the surface of water 14 first, the lookout aboard aircraft 10 knows that probe 12 released all of dye 24 and all of dye 28 before reaching the surface of the water. From either past experimental results or from calculations from the known rate of ascend of probe 12 through the water 14 and the time which it takes to discharge each of the quantities of dyes, an estimate the depth at which plug 22 was pulled from probe 12 can be made.

Figure 2:
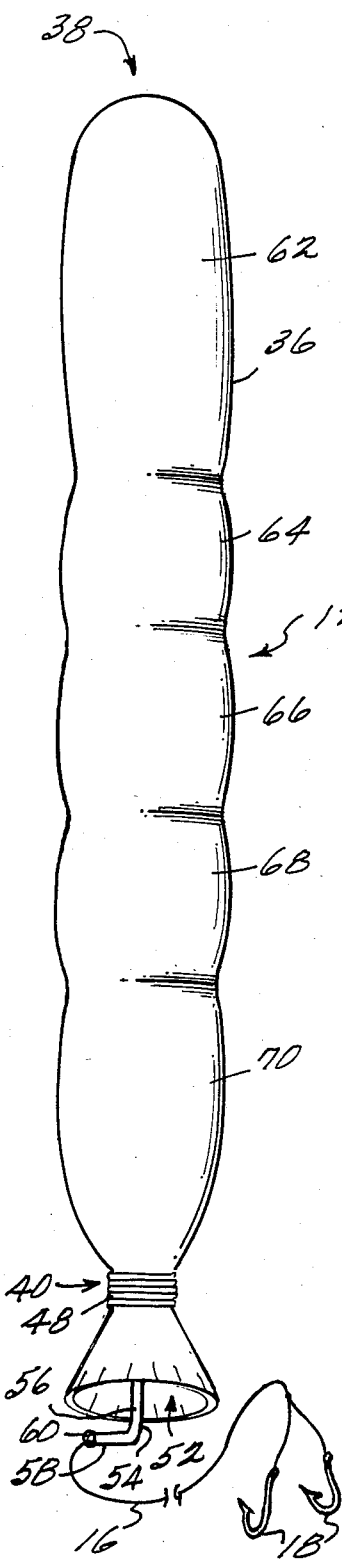
FIG. 2 is an elevated perspective side view of a presently preferred exemplary embodiment of the present invention.
Figure 3:
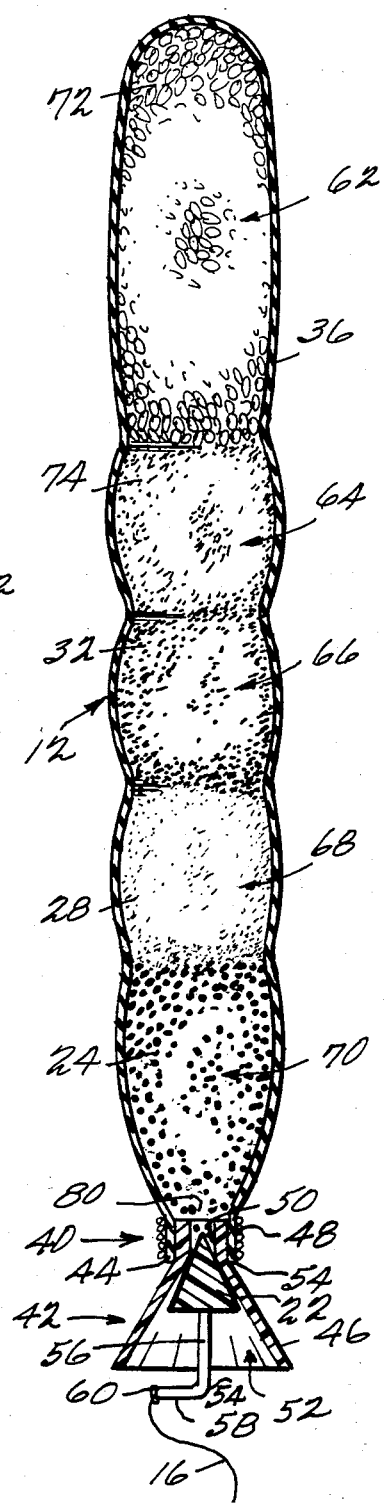
FIG. 3 is a cross-sectional view in plan of the embodiment shown in FIG. 2.

Referring now to FIGS. 2 and 3, probe 12 can be seen to comprise an attentuated, elongated resilient cylindrical tube 36 comprised of such material and construction as to be capable of returning to its original tubular shape after being forceably deformed. Tube 36 is closed at a first end 38 and is open at a neck 40 (located at the end of the tube opposite the second end). Tube 36 may comprise a conventional balloon-like structure having resilient, waterproof rubber-like walls which provide adequate bursting-resistance and a low self-adhesion factor.

A thin-walled internally tapered short sleeve 42 is inserted into the neck 40 of tube 36. Sleeve 42 may comprise a suitable rigid material and includes a cylindrical portion 44 and a connected conical portion 46. Cylindrical portion 44 of sleeve 42 is inserted into neck 40 of tube 36, which is stretched over the cylindrical portion 44 and fixedly attached to the outside of sleeve 42 by wrapping several turns of steel wire 48 around the outside of the neck. The walls of cylindrical portion 44 of sleeve 42 are approximately twice as thick as the walls of conical portion 46 of the sleeve in the preferred embodiment to provide sufficient structural strength against the force exerted by the wire 48. A central aperture 50 is defined through cylindrical portion 44 of sleeve 42 and opens into a conical central aperture 52 defined in the inside of conical portion 46 of the sleeve.

Plug 22 is preferably a solid conical structure composed of a deformable, extremely dense material such as lead or other heavy metal. The material comprising plug 22 should preferably be more malleable and deformable than the material comprising sleeve 42. The radius of the cone defined by plug 22 at a predetermined distance from the vertex of the cone is less than the radius of the cone defined by conical portion 46 of sleeve 42 at the same predetermined distance from the vertex of the cone defined by conical portion 46. In other words, the inside diameter of conical portion 46 of sleeve 42 expands more rapidly than does the outside wall of conical plug 22. Plug 22 is removably inserted into aperture 50 defined by sleeve 42. Because of the respective diameters of plug 22 and sleeve 46, only a small surface area of plug 22 contacts sleeve 42. A conventional waterproof pliable non-hardening sealing compound may be applied at the seat area 54 at which plug 22 contacts with sleeve 42 to better retain the plug in the sleeve and to provide a waterproof seal.

An offset elbow arm 54 is fixedly journalled to plug 22 (such as by molding the plug around the arm, spot welding, or by engaging threads defined by one end of the arm with a threaded passage defined in the plug). Arm 54 includes a first straight portion 56 journalled to plug 22 and a second straight portion 58 defining a right angle with respect to first straight portion 56. The end of second straight portion 58 of arm 54 not connected to straight portion 56 is provided with an eyelet 60. Leader line 16 is attached to eyelet 60, and one or more hooks 18 are attached to leader line 16.

It will be understood by those skilled in the art that due to the extremely small seat area 54 at which plug 22 contacts with sleeve 42, leader line 16 can be pulled in almost direction to pull plug 22 out of sleeve 42. The elbow formed by the intersection of portions 56 and 58 of arm 54 multiplies the leverage of the force exerted through leader line 16 (a torsional cam action) to further reduce the force required to break the seal between plug 22 and sleeve 42. If the leader line 16 is not aligned with member 58, the force exerted by the leader line will add a rotational moment to plug 22 to further aid in breaking it free from sleeve 42. The amount of force used to press plug 22 into sleeve 42, the shape of the plug with respect to the sleeve, the amount and composition of sealer compound used to seal the plug to the sleeve and the length of first straight portion 56 of arm 58 are all selected to achieve a reliable sealing of neck 40 of tube 36 while permitting the force capable of being exerted on leader line 16 by a fish hooked on hook 18 to easily remove the plug from the sleeve.

Tube 36 defines a plurality of chambers along its length. In the preferred embodiment, five chambers 62, 64, 66, 68, and 70 are defined by tube 36. Each of the chambers 62-70 are separated from one another by a slight restriction in the diameter of the tube, as will be explained shortly. Chamber 62 is filled with a buoyant material 72 which decreases the overall density of probe 12 to approximately the density of water. In particular, the density of probe 12 with plug 22 disposed in aperture 50 is slightly greater than the density of water, while the density of the probe with plug 22 removed from the aperture is slightly less than the density of water. Buoyant material 72 may comprise any material having a relatively low density, such as closed cell foam or particles of foamable material. Buoyant material 72 is preferably water-soluble and bio-degradable. The amount of buoyant material 72 disposed in chamber 62 is selected to provide the required buoyancy to the probe 12.

Chambers 64, 66, 68 and 70 are each filled with a quantity of water-soluble dye of different high-visibility colors. Chamber 70 is filled with a quantity of first dye 24, chamber 68 is filled with a quantity of second dye 28, chamber 66 is filled with a quantity of third dye 32, and chamber 64 is filled with a quantity of a fourth dye 74. Dyes 24, 28, 32 and 74 are conventional water-soluble dyes which can be obtained in a variety of different colors (international orange, blue, etc.). Quantities of dye 24, 28, 32 and 74 may be mixed with sand at a predetermined ratio in order to better determine the overall density of probe 12 and to insure that the dyes are dense enough to flow out of the probe through aperture 50 under the force of gravity. The quantity of dye 24 is preferably greater than the quantity of dye 28, which is preferably greater than the quantity of dye 32, which, in turn, is preferably greater than the quantity of dye 74. Each of chambers 64, 68, 68 and 70 are separated by a restriction in the diameter of tube 36 so that a slight restriction in the flow of dye material from one chamber to another results.

Figure 5:
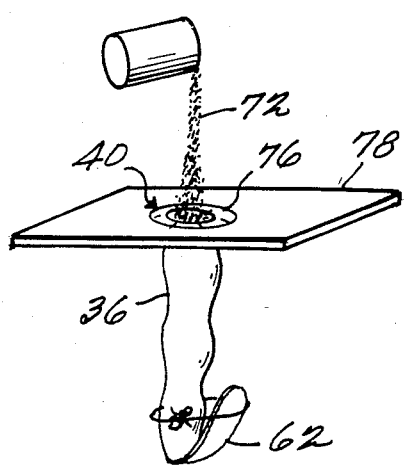
FIG. 5 is an elevated side perspective view of a method of fabricating the embodiment shown in FIG. 2.

As shown in FIG. 5, the buoyant material 72 and the various quantities of dye 24, 28, 32 and 74 are simply successively poured into tube 36. The neck 40 of tube 36 is inserted through a hole 76 defined in the center of a flat board 78 and is held in position so that the neck 40 of the tube extends through the hole and out onto the top of the board. A retaining device such as a ring disposed on board 78 surrounding hole 76 may be used to retain tube 36 in position if desired. A desired amount of buoyant material 72 is poured into the tube 36 through neck 40 to fill the portion of end 38 of the tube which is to become chamber 62. The end portion of the tube 36 filled with buoyant material 72 is then forceably bent upward against the tube to form a separate kinked closed chamber 62. Chamber 62 may be temporarily secured to tube 36 by a length of string 79. A quantity of dye 74 (which, it will be remember, preferably comprises a mixture of water-soluble dye of a predetermined color and sand) is then poured into the tube 36 through neck 40, and the filled section of the tube now forming chamber 64 is likewise bent upwards against the tube to form a separate kinked chamber 64 and is again temporarily secured by string. Each quantity of dye 32, 28 and 24 is successively poured into neck 40 of tube 36 and the resulting filled portions of the tube are bent over in a similar fashion as already described until the entire interior of the tube is filled to the neck. A quantity of dry granular material 80 (such as powder or the like) may be inserted last into the neck portion of tube 36. The neck 40 of tube 36 may then be slipped out through hole 76 defined by board 78 to disengage the board from the tube.

Neck 40 of tube 36 is stretched over the cylindrical portion 44 of sleeve 42 and is secured to the sleeve by tightly wrapping wire 48 over the portion of the neck which covers the sleeve. Cylindrical portion 44 may define a series of ridges (not shown) on its outer cylindrical surface to better engage with neck 40. Seat area 54 and plug 22 are then covered with a small amount of non-hardening sealer compound, and plug 22 is pressed into sleeve 42 to a desired pressure fit to seal aperture 50.

Figure 4:
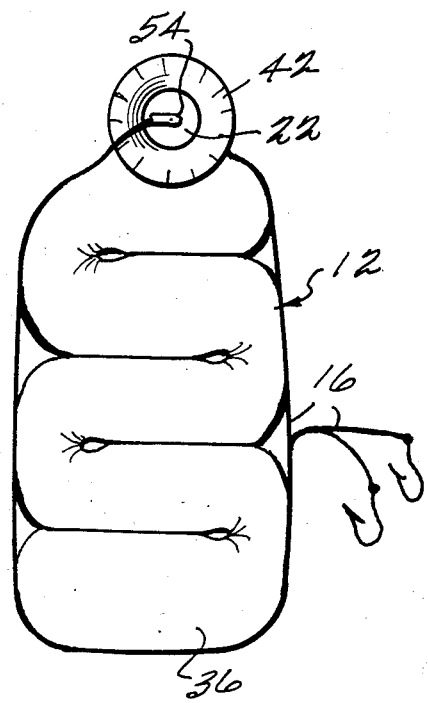
FIG. 4 is an elevated side view of the embodiment shown in FIG. 2 which has been folded for compact storage and deployment.

In order to more compactly store probe 12, the probe is preferably left with a fold between each of chambers 62–70 and is bound together folded-up upon itself (in an accordion or map-like fashion) with a length of leader line 16 (see FIG. 4). Tube 36 may be oval in cross-section to facilitate folding. One end of leader line 16 is attached to eyelet 60 of arm 54, and the leader line is simply wrapped around the folded up tube 36 perpendicular to the folds. Hooks 18 are connected to the other end of leader line 16 and are positioned to avoid puncturing the walls of tube 36 (for instance, the hooks may be attached to sleeve 42 or placed in a protective sheath and temporarily adhered to the outer surface of probe 12). Probe 12 is now ready for baiting and deployment.

To deploy probe 12, hooks 18 are removed from their secured positions and baited with a desired bait. Probe 12 is then simply tossed into the water from a elevated position (such as an aircraft, boat, pier, etc.) The water drag on the bait causes the probe 12 to rotate as it descends through the water until leader line 16 is unwound to the point where the elasticity of tubing 36 unfolds the tube to its original elongated shape. Probe 12 assumes a position in the water where closed end 38 faces toward the surface and weight 22 faces toward the bottom due to the respective locations of the buoyant material 72 and the weight of plug 22. Probe 12 continues to sink into the water unless hook 18 is hooked by a fish or other aquatic creature, and will eventually come to rest on the bottom of the ocean floor if no fish are encountered during the probe's descent.

As previously described, if a fish is hooked on one of hooks 18 and pulls plug 22 out of sleeve 42, probe 12 begins to rise toward the surface of the water with end 38 still oriented toward the surface. Granular material 80 flows out through aperture 50, followed by the quantity of dye 24. Each of the quantities of dye 24, 28, 32 and 74 will flow out of aperture 50 under the force of gravity in successive order. Conical portion 44 of sleeve 42 acts as a "burbler" to agitate the water to disperse the released dye more quickly as the probe ascends. As dye 24 is discharged from chamber 70, the probe 12 will slowly rise toward the surface of the water (since the probe is still very dense). The ascent of probe 12 to the surface will increase in rate as more dye material is discharged through aperture 50. For this reason, it is preferable that the quantity of dye 28 disposed in chamber 68 be less than the quantity of dye 24 disposed in chamber 70 (and likewise that the quantities of dye 32 and 74 be even less accordingly) in order to provide an approximately constant height of the various colored regions formed in the water by each of the dyes at even increments of depth. Because of the restrictive effect of the kinks between the various chambers 62–70, a slight separation will be caused between each colored regions provided that aperture 50 is small enough. The depth at which plug 22 is extracted from sleeve 42 is indicated at the surface of the water by the first predominant color showing on the surface. It will be understood that the colored regions formed by quantities of dyes discharged at greater depths may eventually rise to the surface of the water to color it, and likewise, any quantities of dye remaining in probe 12 when the probe reaches the surface of the water will eventually be discharged from the probe by the effect of wave motion. Therefore, the first color to appear at the surface provides the most useful information about the depth of fish.

Determination of movement or direction of travel or changes in depth of fish are determined by coordinating the successive surface color spots and colors of several of probes 12 which are successively deployed in the same general area in a pattern.

Probe 12 need not be deployed in the manner described above, but could be deployed in other ways. For instance, probe 12 could be intentionally laid to rest on the sea floor to detect the presence of scavenging creatures. Likewise, leader line 16 could be equipped with a flotation device and cut to a desired length to detect the presence of fish at lesser depths while probe 12 is resting on the sea floor. Probe 12 could also be strung in picket drop patterns offshore for the detection of surface feeders, or could be hung from stands extending from the sea floor or from weighted drop lines descending to a predetermined depth. Probe 12 could also be floated on the surface with a radical pass for plug 22 to detect surface feeders.

While the invention has been described in connection with what is presently conceived to be the most practical and preferred embodiment, it is to be understood that the invention is not limited to the disclosed embodiment but on the contrary, is intended to cover various modifications and equivalent arrangements. For instance, hooks 18 need not be attached to leader line 16, but instead could be molded to or in some other way fixedly attached to extend from the periphery of conical portion 46 of sleeve 42. While advantages result from the use of a resilient material for tube 36, a rigid material (such as plastic or thin metal sheet) could be used instead if the resulting difficulties in storing and handling of the probe could be tolerated. While the preferred embodiment comprises four chambers each of which store a different color of dye, any number of chambers could be used (depending upon the depth at which fish are to be sensed) as is convenient. In fact, in very shallow water or for other less general applications, a single chamber and a single color of dye disposed in the chamber would suffice. The dyes described in connection with the preferred embodiment are detectable by eyesight alone, but other forms of indicating material (such as phosphorescent material, electromagnetic wave transmissive or reflective material, etc.) could be used to permit detection by other than visual means. Moreover, while it is preferably that probe 12 is more dense than water with plug 22 in position and less dense than water with plug 22 removed, there might be some applications for the probe wherein it would be desirable to have the probe simply release dye on its descent downward into the water or to simply release dye on its ascend to the surface upon removal of plug 22 without requiring that the plug affect the overall density of the probe. Although sleeve 42 has been described as having a conical portion and a cylindrical portion and plug 22 has been described as having a conical shape, those skilled in the art will understand that other shapes and configurations for sleeve 42 and plug 22 might work equally as well (depending, of course, upon the desired tension required to remove the plug from the sleeve). In fact, in a rudimentary form of the probe, sleeve 42 could be omitted entirely and plug 22 could simply directly seal neck 40 of tube 36. Accordingly, the invention is intended to cover all such modifications and equivalent arrangements included within the spirit and scope of the appended claims, which scope is to be accorded the broadest interpretation of such claims as to encompass all such equivalent structures and methods.

What is claimed is:

1. An apparatus for detecting fish below the surface of the water, comprising:
    body means having a chamber and an aperture for sinking below the surface of the water;
    sensing means coupled to said body means for sensing the presence of fish below the surface of the water; and
    indicating means, responsive to said sensing means, for producing a visual indication at the surface of the water of the presence of said fish, said indicating means including:
    coloring means initially contained within the chamber of said body means for coloring said water, and
    releasing means within the aperture and connected to said sensing means for releasing said coloring means into said water from said body means at said surface in response to a pull on the sensing means by a fish below said surface that removes said releasing means from said aperture.

2. An apparatus as in claim 1 wherein said sensing means includes hooking means for hooking said fish.

3. An apparatus as in claim 1 wherein: said the removal of releasing means also causes said body means to ascend to the surface of the water in response to a sensed presence of fish in the water by said sensing means, and sequentially releases a plurality of different materials into the water as said body means ascends to the surface of the water, each of said different materials coloring said water a different color.

4. An apparatus as in claim 3 wherein:
    said body means includes means for defining a plurality of interconnected chambers, one of said plurality of different materials being disposed in each of said plurality of chambers; and
    removal of said releasing means from said aperture allows includes for communication of one of said plurality of interconnected chambers with the water.

5. An apparatus as in claim 4 wherein:
    said releasing means includes plug means, removably disposed in said aperture, for plugging said aperture and for increasing the density of said body means to greater than the density of water; and said sensing means includes hooking means, connected to said plug means, for hooking a fish and for coupling the force exerted by said hooked fish to said plug means to remove said plug means from said aperture.

6. An apparatus as in claim 4 wherein the removal of said releasing means causes the density of said body means to become less than the density of water.

7. An apparatus as in claim 4 wherein said body means comprises a cylindrical tube, open at one end and closed at the other end, said tube including walls comprising a resilient material, said plurality of interconnected chambers being defined by said walls and separated from one another by restrictions in the walls of said tube, said open end of said tube defining said aperture.

8. An apparatus as in claim 7 wherein said body means comprises an elongated balloon.

9. An apparatus as in claim 7 further including means for retaining said body means in a folded-up configuration until said body means sinks below the surface of the water, said body means being folded at said restrictions in the walls of said tube.

10. An apparatus for detecting fish, comprising:
at least a first quantity of means for coloring water;
body means, adapted to submerse freely floating in the water, having a chamber for containing said first quantity of coloring means, said body means together with said first quantity of coloring means having a density which is less than the density of said water, said body means including means for defining an aperture communicating with said coloring means through an exterior surface of said body means in contact with the water;
plug means, removably disposed within said aperture, for sealing said aperture, said plug means increasing the density of the combination of said body means, said quantity of coloring means and said plug means to exceed the density of water; and
hook means, operatively connected to said plug means, for hooking a fish and for coupling the force exerted by said hooked fish to said plug means to remove said plug means from said aperture.

11. A method for detecting fish in the water including the steps of:
sinking a body below the surface of the water; sensing the presence of fish below the surface of the water; and
releasing a quantity of material at the surface of the water which colors the water in response to said sensing of the presence of fish by said sensing step.

12. A method as in claim 11 wherein said sensing step includes the step of hooking said fish.

13. A method as in claim 11 wherein:
said sensing step includes the step of permitting said body to ascend to the surface of the water in response to the presence of fish in the water; and
said releasing step includes the step of sequentially releasing a plurality of different materials into the water as said body ascends to the surface of the water, each of said different materials coloring the water a different color.

14. A method as in claim 13 wherein said releasing step includes the step of releasing, in sequence, each of a plurality different colored materials, the quantities of said colored materials increasing from the last to be released to the first to be released.

15. A method as in claim 13 wherein said sensing step includes the step of communicating one of a plurality of interconnected chambers defined by said body with the water when said sensing step senses said fish, said plurality of different materials being disposed in different ones of said interconnected chambers.

16. A method as in claim 15 wherein said sensing step includes the steps of:
hooking said fish with a hook connecting to a plug removably disposed through an aperture defined in an exterior surface of the body in contact with the water and communicating with one of said plurality of interconnected chambers; and
removing said plug from said aperture with the force exerted by said hooked fish in order to communicate said one of said plurality of interconnected chambers with the water.

17. A method as in claim 15 wherein said permitting step includes the step of removing a plug from an aperture defined by said body, said body having a density which is less than the density of the water except when said plug is disposed in said aperture.

18. A method as in claim 12 wherein:
said method further includes the preliminary step of folding said body into a folded-up configuration; and
said method further includes the step of unfolding said body as said body sinks.

19. A method for detecting fish, including the steps of:
sinking a free-floating body below the surface of water, said body having an initial density which is greater than the density of water, said body operatively connected to at least one hook;
hooking a fish with said hook;
removing a plug from an aperture defined by said body with the force exerted on said hook by said hooked fish;
decreasing the density of said body to less than the density of water as a result of said removing step thereby causing said body to ascend toward the surface of the water; and
releasing a quantity of a substance through said aperture from a chamber in said free-floating body at the surface of the water, said substance changing the color of said water.

20. A method as in claim 19 wherein:
said releasing step includes the step of sequentially releasing a plurality of different substances into the water as said body ascends toward the surface, each of said different substances changing the color of said water to a different color; and further including the subsequent step of ascertaining the depth at which said plug was removed from said body by observing the color first appearing at said surface.

21. An apparatus as in claim 3 wherein said releasing means releases, in sequence, each of a plurality different colored materials, the quantities of said colored materials increasing from the last to be released to the first to be released.

22. A method for detecting the depth below the surface of water at which a school of fish exists comprising the steps of:
sinking a body below the surface of the water;
detecting said school of fish as said body sinks below said surface;

elevating said body to said surface in response to detection of said school of fish;

sequentially releasing a plurality of different substances from said body into the water in response to detection of said school of fish as said body ascends to the surface, each of said different substances changing the color of the water to a different color;

observing the color first appearing at the surface of the water; and ascertaining, in response to said first-appearing color, the depth below said surface at which school of fish is detected by said detecting step.

23. A method as in claim 23 wherein said sequentially releasing step includes the steps of:

releasing a first quantity of a first substance as said body rises at a first rate, thereby decreasing the density of said body; and thereafter releasing a second quantity less than said first quantity of a second substance as said body rises at a second rate greater than said first rate.

24. A method as in claim 22 wherein said releasing step includes the step of forming a plurality of layered colored regions of water, said regions each having approximately the same vertical dimension.

25. A method as in claim 22 further including the step of agitating the water as said body ascends so as to more rapidly disperse said substances through the water.

26. A system for detecting the depth below the surface of the water at which a school of fish exists, comprising:

body means having connecting chambers and an aperture for sinking below the surface of the water and also for containing a plurality of different substances; releasing means within said aperture and connected to a sensing means for detecting a school of fish by a fish pulling on said sensing means;

removal of said releasing means from said aperture causes elevation of said body to said surface in response to detection of said school of fish by said sensing means; and said aperture allowing sequential releasing of said plurality of different substances from said body into the water in response to detection of said school of fish as said body ascends to the surface, each of said different substances changing the color of the water to a different color.

27. A system as in claim 26 wherein said releasing means releases a first quantity of a first substance as said body rises at a first rate, thereby decreasing the density of said body, and said releasing means releases a second quantity less than said first quantity of a second substance as said body rises at a second rate greater than said first rate.

28. A system as in claim 26 wherein removal of said releasing means causes a plurality of layered colored regions of water to be formed said regions each having approximately the same vertical dimension.

29. A system as in claim 26 further including means adjacent the aperture for agitating the water to increase the rate of dispersion of said substance.

30. A system for detecting fish as claimed in claim 27 wherein when said body means reaches the surface of the water all of the remaining coloring substances will be released at the surface which thereby indicates the depth at which the sensing means was pulled.

* * * * *